July 16, 1957

F. BEAL 2,799,154

LOCKING SYSTEM FOR AUTOMOTIVE VEHICLES

Filed Nov. 17, 1953

INVENTOR.
FAY BEAL
BY
Charles S. Penfold
ATTORNEY

July 16, 1957              F. BEAL              2,799,154

LOCKING SYSTEM FOR AUTOMOTIVE VEHICLES

Filed Nov. 17, 1953              4 Sheets-Sheet 2

INVENTOR.
FAY BEAL
BY
Charles S. Penfold
ATTORNEY

INVENTOR.
FAY BEAL
BY
Charles S. Penfield
ATTORNEY

July 16, 1957  F. BEAL  2,799,154
LOCKING SYSTEM FOR AUTOMOTIVE VEHICLES
Filed Nov. 17, 1953  4 Sheets-Sheet 4

INVENTOR.
FAY BEAL
BY
Charles S. Penfold
ATTORNEY

United States Patent Office 2,799,154
Patented July 16, 1957

2,799,154

LOCKING SYSTEM FOR AUTOMOTIVE VEHICLES

Fay Beal, San Marino, Calif., assignor to Josephine Beal

Application November 17, 1953, Serial No. 392,593

14 Claims. (Cl. 70—264)

The invention relates generally to a lock and a locking system and more particularly to locks which can be operated manually and/or electrically.

The invention may be used wherever applicable but is primarily adapted for use in an automotive vehicle and offers certain advantages over locks now in commercial use.

An important object of the invention is to provide an accessory that can be readily installed for operation in conjunction with any manual controlled lock so that the lock can be operated either manually or electrically.

The accessory embodying the invention and exemplified in the drawings has been designed and constructed for use with a lock of the type employed on vehicles now being manufactured by General Motors Corporation. In such vehicles, for example, a four door sedan, each of the front doors is provided with a plurality of manual controls for operating the lock.

More particularly in this respect, the inner side of each front door is provided with a pivoted handle which when swung in one direction will release the latch of the lock to permit one to open the door. The inner side of each of these doors is also provided with a manually operable vertically movable rod for placing the lock in a condition so that the door cannot be opened from without. The outer side of each front door is provided with a fixed handle having a reciprocable cylinder or plunger associated therewith which when manually pressed when the door is closed will release the latch so that the door can be opened. This exterior cylinder and the vertically movable rod on the inside of the door are operatively connected with certain components of the lock in such a way that if the door is opened and the rod is depressed and the plunger is then pushed in and held while the door is being closed the door will be locked without using a key. To obtain entry into the vehicle or car it is, of course, necessary to manipulate the key in the lock so that the latch can be released by depressing the plunger.

The lock on the inside of each of the rear doors is provided with a pivoted handle and a manually operable vertically movable member. The outer side of each rear door is provided with a fixed handle having a plunger which can be depressed in the same way as the plungers on the front doors. The latch of each of the rear locks is releasable by operating either the plunger or the pivoted handle. No keys are provided for the rear doors because these doors can only be locked and unlocked to prevent entry by actuating the vertically movable members.

With the foregoing in mind, an important object of the invention is to provide a primary control unit and secondary control units which can be readily operatively connected with any one or all of the conventional mechanical locks on the doors of a vehicle for electrically controlling the locks. More particularly, each primary control unit is preferably comprised of an actuating means, a solenoid or electro-magnet assembly and a switch mechanism and each of the secondary control units for some installations is substantially the same as a primary unit except that the switch mechanism is omitted.

The control units may be operatively connected in different ways. For example, as exemplified in the drawings, manual actuation of the lock on the left front door will actuate a switch incorporated with the lock for simultaneously actuating secondary control units associated with the locks on the other doors to lock or unlock them. Also exemplified is an arrangement whereby a master switch is operatively connected with primary control units incorporated with the locks on the front doors and secondary control units incorporated with the locks on the rear doors so that by manipulating the master switch the locks on all of the doors can be locked or unlocked. Moreover, there is further exemplified an electrical system in which primary control units are associated with the door locks so that by manipulating any one of the locks the remaining locks will be simultaneously locked or unlocked by actuation of the control units.

A significant object of the invention is to provide a control unit in which the actuating means, solenoid assembly and switch mechanism are operatively connected together in a unique manner.

A particular object of the invention is to provide a novel solenoid or electro-magnet assembly comprising a bracket provided with a tube, a pair of coils supported in axial spaced relation on the extremities of the tube, a rod constituting an armature slidably mounted in the tube for activation by either coil, and a bridge or connecting member carried by the rod for movement therewith when the bridge moves in unison with the actuating means.

Another object of the invention is to provide a locking system which promotes safety and contributes to prevent unlawful entry and theft.

An important object of the invention is to provide a locking system of the character described which enjoys the merits of simplicity, efficient operation, wide adaptability, reliability, and freedom from trouble or expense for maintenance.

Another object of the invention is to provide a system of moderate cost which offers advantages with respect to installation as original equipment item or as an accessory.

Additional objects and advantages of the invention will become apparent after the description hereinafter set forth is considered in conjunction with the drawings annexed hereto.

Referring to the drawings, wherein one embodiment of the invention is exemplified.

Figure 1:
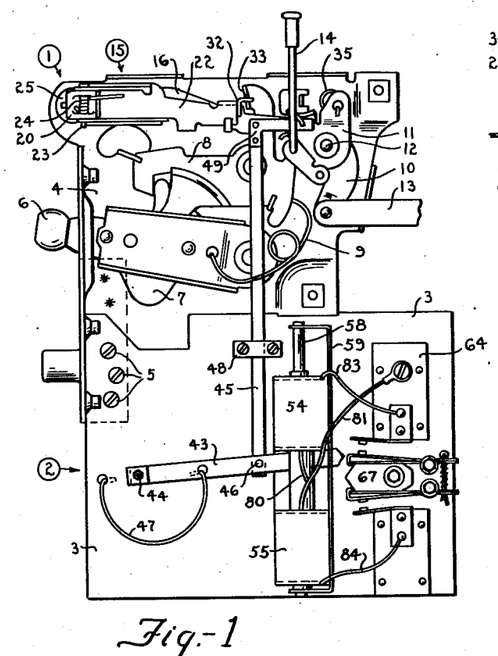
Figure 1 is an elevational view of a conventional front door lock showing a control unit operatively connected thereto.

Referring to the drawings and particularly to Figure 1, there is illustrated a conventional door lock generally designated 1 and an electrical control unit generally designated 2 operatively associated with the lock. The control unit or accessory 2 includes a support 3 which is connected to a mounting plate 4 of the lock by screws 5 to position the plate and support in substantially the same plane and locate the components of the lock and unit in proper operative relationship.

Figure 4:
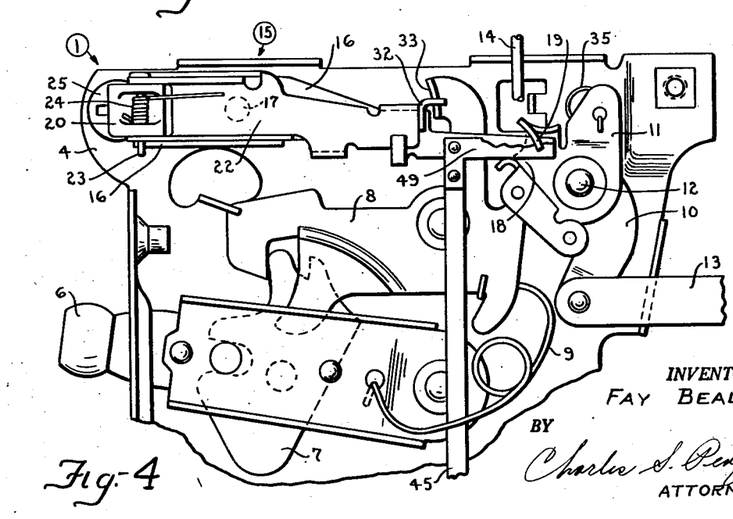
Figure 4 is an enlarged elevational view of a portion of the lock structure depicted in Figure 1.
Figure 6:
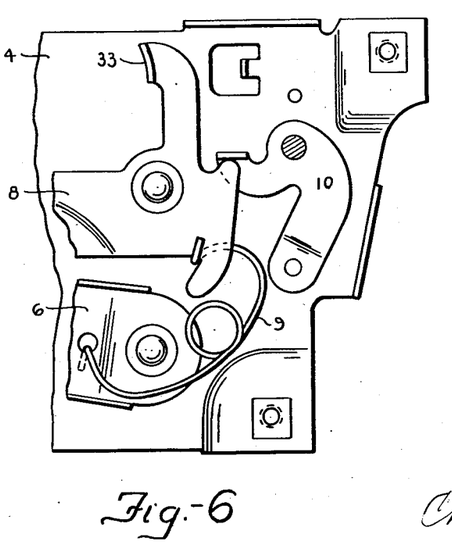

The conventional lock structure exemplified in Figures 1 and 4, includes, among other things, a latch 6 pivoted on the mounting plate 4, an oscillator 7 pivoted on the plate and connected to the latch by a pin and slot connection, and a catch 8 pivoted on the plate and related to the oscillator. The latch and catch are connected adjacent their inner ends by a spring 9 for normally urging their outer left extermities downwardly. A crank 10 and a movable component preferably in the form of a lever 11 are both mounted on a pivot 12. An inner pivoted handle, not shown, is located in the inner side of the car door and is connected to the crank by an arm 13. A pull on the handle will cause the crank to engage the catch as shown in Figure 6 and release the catch from the oscillator 7 whereupon the latch will swing downwardly to permit opening of the door.

Figure 2:
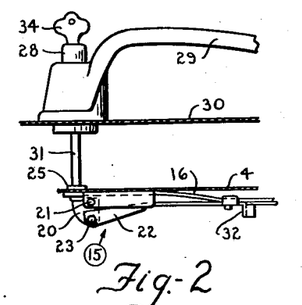
Figure 2 is a partial top view of the structure illustrated in Figure 1, showing an exterior door handle, plunger, and key in the plunger, including associated parts.
Figure 3:
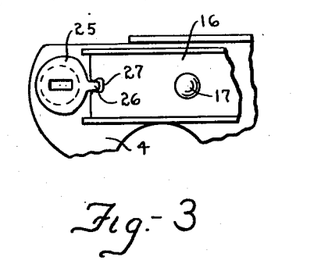
Figure 3 is an enlarged elevational view of a portion of the lock structure that is operated by the key.

A vertically movable manually operable rod 14 is also mounted on the inner side of the car door and is connected to the lever 11 for moving an operating means generally designated 15 for locking the door from the inside. The operating means includes an elongated element 16 pivotally connected to the plate at 17, as shown in Figures 3 and 4, and its inner end is received in a formation 18 provided on the lever and is held against accidental displacement by a lug 19. The operating means also includes a rocker 20 pivoted at 21 to the element 16; an elongated slide 22 pivoted at 23 to the rocker, as shown in Figure 2; and a coiled spring 24 about the pivot 23 for simultaneously urging the rocker against a slotted mover 25 pivoted on the plate and the slide 22 to a retracted position as shown in Figures 1, 2 and 4. The mover 25 has a projection 26 disposed in a notch 27 provided in the element 16 as shown in Figure 3. As illustrated in Figure 2 a plunger or lock cylinder 28 is associated with a fixed door handle 29 mounted on the exterior panel 30 of a door. The plunger is provided with a shaft 31 which extends into the slot of the mover 25. The plunger primarily serves the same purpose as the pivoted handle on the inner side of the door. More particularly in this regard, and assuming that the latch is in its elevated position for holding the door closed, when the plunger is pushed inwardly the shaft 31 will actuate the rocker 20 and cause the slide 22 to move inwardly so that an abutment 32 thereon will engage a finger 33 on the catch 8 and swing the catch in a clockwise direction and release it from the oscillator 7 whereby the latch 6 will be released from the abutment means carried by a door frame or pillar, not shown, and then descend through the assistance of the spring 9.

Figure 5:
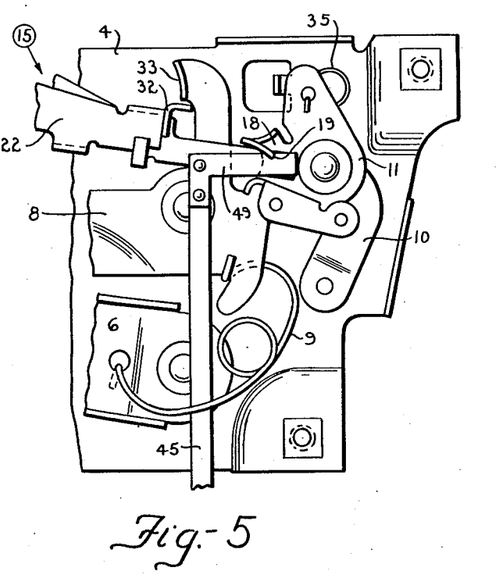
Figures 5 and 6 are similar views of the lock structure illustrating certain details of construction.

On the other hand, and assuming that the parts are positioned as illustrated in Figure 1, and a key 34 associated with the cylinder or plunger 28 is turned in one direction the mover 25 will swing the operating means 15 and thereby locate the abutment 32 on the slide 22 at one side of the finger 33 on the catch as depicted in Figure 5. Since the lever is connected to the element, and the rod is connected to the lever, the lever and rod will be actuated when the operating means is pivoted by manipulating the key. A spring 35 is connected to the plate 4 and to the lever 11 to assist in maintaining the operating means in either of two off-center positions. It will thus be apparent that when the parts are in the position of Figure 5, pressing of the plunger will effect movement of the slide 22 but such movement is ineffective to actuate the catch because the abutment 32 cannot engage the finger 33. It will also be manifest, that by manipulating the key in an oppoiste direction, the operating means will be moved back to the position depicted in Figure 1 so that pressing of the plunger 28 will cause the slide 22 to pivot the catch and release it from the oscillator to permit the latch in turn to release itself from abutment means, not shown, provided on a door frame or pillar. Manipulation of the rod 14 will, of course, effect the same movement of the operating means 15 as the key 34.

The various components of the lock structure also afford a setup whereby the door can be locked from the outside without using the key. In this respect it is believed sufficient to state that this is accomplished by pushing down on the rod 14 when the door is open and then the plunger 28 is held in a depressed condition while the door is closed.

The above described lock structure is conventional and is claimed only to the extent that any one or all of the various electrical control units are operatively connected thereto in a particular way.

Figure 10:
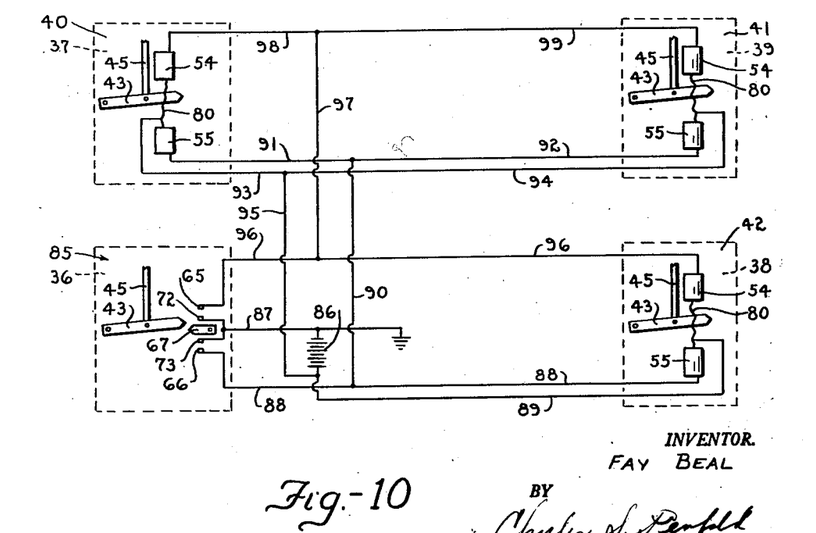
Figure 10 is a diagrammatic view exemplifying one electrical hookup between the four locks of a vehicle.

As alluded to above, the electrical control units can be operatively connected in different ways to the locks to obtain different results. For example, as shown in Figure 10 of the drawing, numerals 36 and 37 represent in dotted lines the left and right front doors of a car and 38 and 39, the left and right rear doors. A switch mechanism actuable by the rod 14 mounted on the left front door serves to simultaneously electrically operate secondary control units 40, 41 and 42 respectively mounted on each of the other doors for locking and unlocking the doors. The doors 37, 38 and 39 can be locked or unlocked manually independently of the electrical controls and the left front door can be locked or unlocked by utilizing the key or the rod 14 which controls the operation of the units on the other doors. If found desirable, as exemplified in Figure 11, the electrical system may be modified by placing primary control units on the front doors with secondary control units on the rear doors and providing a master switch remote from the doors for simultaneously actuating all controls. Moreover, as illustrated in Figure 12, primary control units are associated with all of the locks so that by manipulating any one of the locks the others will be automatically locked or unlocked.

The primary control unit 2 will now be described. As exemplified in Figures 1 and 9, this unit includes the support 3, which is preferably detachably connected by screws 5 to the mounting plate 4 of the conventional lock structure. The control unit, as mentioned above, may constitute an accessory or an integral part of the lock structure as an original equipment item. The control unit is so designed and constructed that it can be easily and quickly operatively associated with the conventional lock structure described. More particularly in this regard, the control unit, among other things, comprises actuating means, a solenoid assembly and a switch mechanism. The actuating means may be designed and constructed in various ways, but as herein shown, preferably includes a bar 43 pivoted at 44 to the support, an elongated actuator 45 having its lower end pivoted to the bar at an intermediate point 46, and a C-shaped spring 47 having one end connected to the support and its other end to the bar at a point between 44 and 46.

A guide 48 for the actuator 45 is carried by the support and the upper end of the actuator is provided with a fitting having an offset 49 which extends into the formation 18 on the lever 11 of the lock and is held in the fromation by the lug 19 which also holds a portion of the element 16 in the formation, as illustrated in Figures 1 and 4. With this arrangement, motion is transmitted to the actuator whenever the movable component or lever 11 is operated, for example, by the rod 14.

The C-shaped spring 47 serves to maintain the actuator 45 either in an elevated or lowered position. The coiled spring 35, above referred to, connecting the lever 11 to the plate 4, also serves the same purpose as the spring 47, so, if found desirable, the spring 35 can be omitted, provided the spring 47 is sufficiently strong to produce the desired result or both springs can be utilized for the purpose as shown. Obviously, if a stronger spring were substituted for spring 35, the spring 47 could be eliminated.

Figure 7:
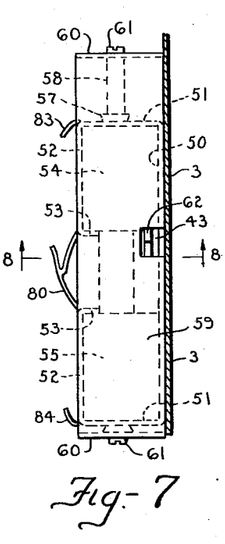
Figure 7 is a view of the solenoid assembly.
Figure 8:
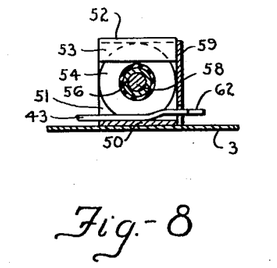
Figure 8 is a transverse section taken substantially on line 8—8 of Figure 7 illustrating details of construction.
Figure 9:
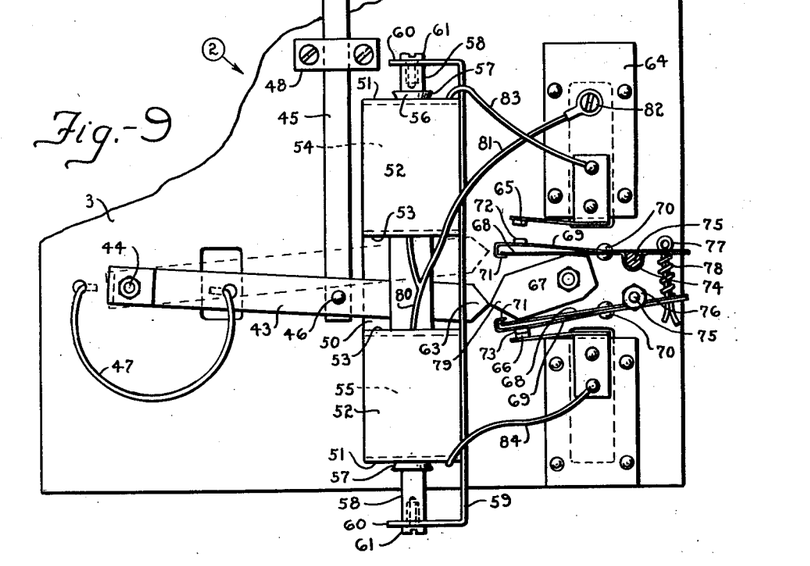
Figure 9 is an enlarged partial elevational view of the secondary switch mechanism constituting a component of the control unit.

The solenoid or electro-magnet assembly of the control unit 2 is unique in design and construction and, as exemplified in Figures 7, 8 and 9, includes an elongated bracket having a base wall 50 attached to the support 3, a pair of corresponding end walls 51, and a pair of corresponding top walls 52 extending toward one another in a plane parallel to the base wall. The top walls are each provided with an inturned wall 53. The walls of the bracket are preferably formed as described to provide a pair of corresponding formations with coils 54 and 55 of electro-magnets or solenoids respectively disposed in the formations for support and protection.

More particularly in this regard, a cylindrical tube 56 extends through apertures provided therefor in the end walls 51 of the bracket and the ends of the tube are distorted or upset as indicated at 57 to secure the tube in place. The coils are supported on the tube 56 with each coil preferably being cemented or otherwise anchored to an end wall 51 of the bracket. The inturned walls 53 may also serve to prevent accidental axial displacement of the coils on the tube. A cylindrical rod 58 constituting an armature for both coils is slidably mounted in the tube and is connected to a bridge or connecting member. The bridge includes an elongated portion 59 extending along one side of the bracket between the coils and switch mechanism and has offset ends 60 overlapping the end walls 51 of the bracket. The ends of the rod are preferably respectively detachably connected to the offset ends of the bridge by screws 61 which extend through apertures in the offset ends and connect with threaded holes in the rod. The portion 59 of the bridge is provided with a notch 62 which receives the pivoted bar 43 so that when the actuator 45 is moved up or down the bar will reciprocate the rod and bridge as a unit on the tube 56. The end of the bar extending through the notch 62 is preferably provided with a pointed end 63 which is adapted to actuate the switch mechanism.

The switch mechanism may be designed and constructed in various ways, but as clearly depicted in Figure 9 includes a stationary contact assembly comprising an insulator base 64 attached to the support 3 and a member secured to the base and having a stationary contact 65 thereon. A similar contact assembly is also carried by the support and is provided with a member having a stationary contact 66 thereon disposed in predetermined spaced relationship to the contact 65.

A pair of corresponding movable contact means are located between the stationary contact assemblies above referred to and a kicker 67 is pivoted on the support 3 and disposed between the contact means for actuating the contact means with respect to the stationary contacts 65 and 66. The kicker is slotted to reduce the weight factor. Each of the movable contact means preferably includes an elongated rigid member 68 and an elongated resiliently flexible element 69 secured to the rigid member by a rivet 70. The inner extremity of the element is bowed or curved outwardly and is provided with an offset end 71 which overlaps the inner face side of the rigid member 68. The bowed portion of one of the elements is provided with a contact 72 for cooperation with the contact 65 and the other element has a contact 73 cooperable with the contact 66. Each of the rigid members is provided with an arcuate portion 74 which in combination with the flexible element 69 forms a socket embracing a threaded post 75 having a nut 76 thereon for holding the contact means on the post. The posts are disposed in parallel relation at predetermined locations so that the contact means will swing or pivot in a plane parallel to the plane of the support 3. A pin 77 extends through the opposed outer ends of the members 68 and elements 69 and a helical spring 78 surrounds the pin and is located between the members 68 for urging and causing the members 68 to engage the sides of the kicker 67 and maintain the kicker in a predetermined centered position with its pointed end 79 arranged in the path of movement of the pointed end 63 of the bar 43. The arrangement is such that the yieldable contacts 72 and 73 will respectively engage the stationary contacts 65 and 66 when the kicker is moved upwardly and then downwardly by the bar 43. Attention is directed to the fact that the outer corners of the kicker 67 are bevelled to provide clearance and reduce friction between the kicker and the rigid members 68. It should also be noted that when the kicker is moved downwardly by the bar 43, the kicker will force the rigid member 68 and flexible element 69 in a direction to cause the contact 73 on element 69 to engage the contact 66 and force the bowed portion of the element to contact or move toward the rigid member as shown in Figure 9. The flexible element is thus placed under tension to continuously increase the pressure exerted by contact 73 on contact 66 to insure a positive kiss and sliding engagement therebetween and thereby appreciably prevent arcing. When the kicker is moved to a lower predetermined position, the pointed end of the bar 43 will release itself from the pointed end of the kicker, whereupon the kicker will automatically swing back to a neutral or center position by the spring 78.

As depicted in Figures 1 and 9, the coils 54 and 55 are joined together by a conductor 80 and a conductor 81 connects conductor 80 with a terminal 82 carried by the insulator base 64 and insulated from the contact 65. The terminal 82 is preferably adapted for connection with a battery and the contact means are grounded through the support. The coil 54 is also connected by a conductor 83 to the base of the member supporting contact 65 and coil 55 is similarly connected by a conductor 84 to the base of the member supporting contact 66. The conductors 83 and 84 preferably extend through holes provided therefor in the end walls 51 of the bracket. This electrical hookup is such that when current traverses through the coil 54 the rod 58 constituting an armature will pull the rod upwardly and unlock the locks and when the current is switched over to traverse the lower coil 55 the rod will be pulled downwardly to effect a locking of the lock.

Referring again to the wiring system illustrated in Figure 10, there is diagrammatically disclosed a pair of front doors 36 and 37 and a pair of rear doors 38 and 39. The left front door 36 is provided with a control unit generally designated 85 provided with an actuator 45, a bar 43, and a switch comprised of the stationary contacts 65 and 66 and movable contacts 72 and 73. Each of the doors 37, 38 and 39 are respectively provided with corresponding control units 40, 41 and 42. Each of the control units 40, 41 and 42 includes an actuator and bar as in the unit 85 on the left front door and further includes a solenoid assembly of the kind described above having a pair of coils 54 and 55, and a slidable rod 58, and a bridge 59 not shown. The arrangement is such that by manipulating the actuator 45 of the control unit 85 associated with the lock on the left front door will lock this door and simultaneously electrically operate the control units 40, 41 and 42 for locking or unlocking the doors 37, 38 and 39.

More specifically in this regard, the system shown in Figure 10 includes a source of electrical energy such as a battery 86 and several circuits for connection therewith when the switch of the control 85 is actuated for example by a rod 14. A conductor 87 connects the battery to the movable contact means having contacts 72 and 73; a conductor 88 connects stationary contact 66 with coil 55 of the control 42 and a conductor 89 connects this coil will the battery to constitute one circuit. A conductor 90 connects conductor 88 with conductors 91 and 92 which respectively lead to the coils 55 of the control units 40 and 41 and conductors 93 and 94 connect these coils with a conductor 95 which goes to the battery 86 to constitute two additional circuits. These three circuits are connected as set forth so that when the actuator 45 is depressed by a rod 14, the kicker 67 will move the contact 73 into engagement with contact 66 and cause current to flow through all of the lower coils 55 to pull the armature rods down including the actuators 45 to operate a movable component on each of the locks on doors 37, 38 and 39 to a position whereby the locks on the front doors can only be unlocked by the key 34, or by manipulating the inner pivoted handles on the front doors to actuate the arms 13 of the locks of the character described above. In other words, after all the locks are locked from the inside by actuating the actuator of the control 85, the locks on the front doors can only be unlocked manually from the outside by using a key.

To unlock the doors 37, 38 and 39 electrically, the actuator 45 of the control 85 on the left front door is pulled upwardly through the agency of a rod 14 to actuate the switch thereon to energize the upper coils 54 to cause the armature rods 58 respectively associated therewith to reciprocate upwardly to cause simultaneous operation of the actuators 45 to effect movement of certain components so that the latches on the doors can be operated. The electrical hookup for this purpose includes, among other things, a conductor 96 connecting contact 65 with the upper coil 54 of control unit 42; a conductor 97 connecting conductor 96 with conductors 98 and 99 respectively leading to the upper coils 54 of control units 40 and 41. The arrangement is such, that when the contacts 72 and 65 are engaged the upper coils are energized to produce the results described. It will be noted that some conductors are common to the circuits leading to the upper and lower coils. It is, of course, obvious that the locks on the doors 37, 38 and 39 can be actuated manually without utilizing the electrical system.

Figure 11:
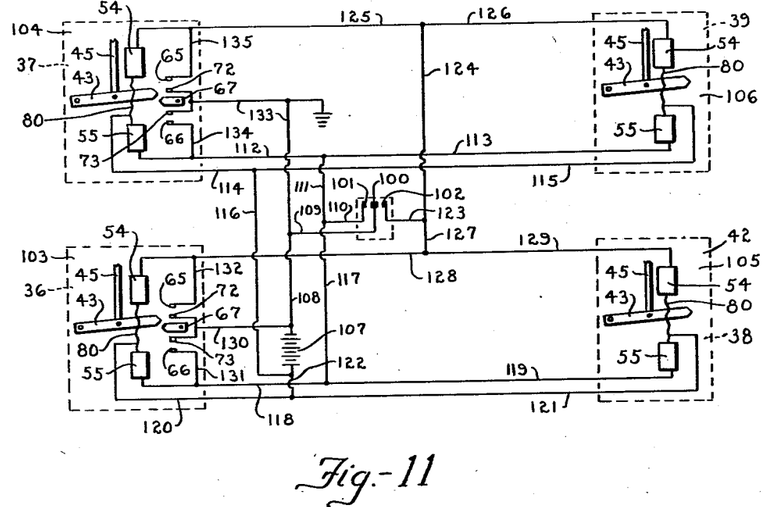
Figure 11 is a diagrammatic view of another electrical hookup between the locks with a master switch located remote from the locks.
Figure 12:
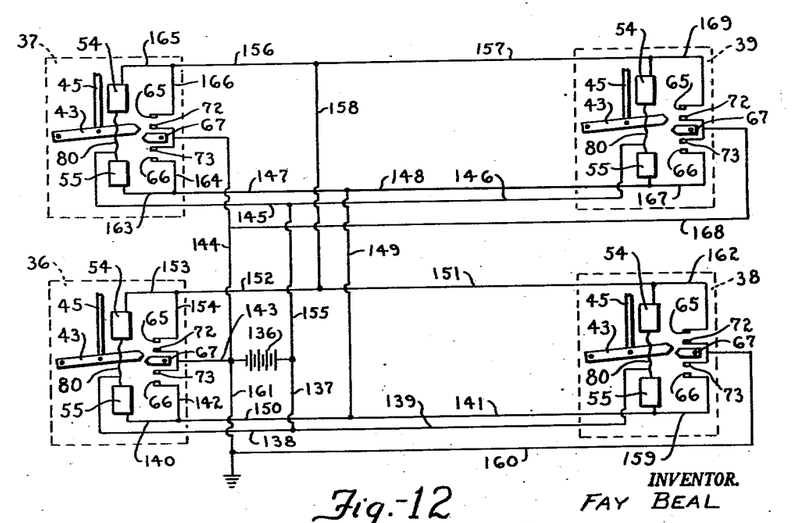
Figure 12 is a further modification showing primary control units on all of the doors so that operation of any one of the units will simultaneously actuate the others.

Referring to Figure 11 of the drawing there is exemplified a wiring diagram of a system whereby a single master switch located at some convenient location can be manipulated to simultaneously lock or unlock all of the doors.

The electrical hookup whereby the single master switch may be manipulated for the purpose above referred to includes a master switch having a contact 100 which may be moved into engagement with either of the contacts 101 or 102. A pair of corresponding control units 103 and 104 are respectively mounted on the left and right front doors 36 and 37 of the vehicle and controls 105 and 106 of a character different from the controls 103 and 104 are respectively mounted on the rear door 38 and 39. A source of electrical energy or battery 107 is provided and a conductor 108 is joined to a conductor 109 leading to the movable contact 100 of the master switch. When the contact 100 is moved to the left to engage contact 101, current will flow from the battery through conductors 108 and 109, contacts 100 and 101, conductors 110 and 111, conductors 112 and 113, through the lower coils 55, through conductors 114 and 115 and through a conductor 116 connecting the conductors 114 and 115 to the battery to energize the lower coils 55 of the controls 104 and 106. Current will also flow from the battery 107, conductor 108, contacts 100 and 101, conductors 110 and 117, conductors 118 and 119, through the lower coils 55 of the control units 103 and 105 and through conductors 120 and 121, and back to the battery through conductor 122. Thus, the lower coils of all of the control units are simultaneously energized by moving the contact 100 of the master switch to engage the contact 101. This simultaneous energization of the lower coils will cause the actuator 45 of each of the controls to be pulled downwardly to transmit motion to some movable component on each of the locks of the doors to effect locking thereof.

To effect simultaneous energization of all of the upper coils of the control units the contact 100 is moved to the right to engage the contact 102. When this occurs, current will flow from the battery 107, through conductors 108 and 109, contacts 100 and 102, conductor 123 to a conductor 124 which is connected to conductors 125 and 126 leading to the upper coils 54 of the controls 104 and 106 on the right side of the vehicle, through conductors 114 and 115 and back through conductor 116 to the battery to energize the upper coils 54. Current will also flow from the battery 107 through conductors 108 and 109, contacts 101 and 102, conductors 123 and 127, conductors 128 and 129, the upper coils 54 of the controls 103 and 105, conductors 80, through conductors 120 and 121 and back to the battery through conductor 122 to simultaneously energize said upper coils. Thus, all of the upper coils 54 of the four controls can be simultaneously energized to pull the armature rods upwardly and transmit motion to a movable locking component on each of the four locks so that the doors can be unlocked.

As mentioned above, the system illustrated in Figure 11 also provides an arrangement whereby the control 103 on the left front door 36 may be actuated to simultaneously operate the controls 104, 105 and 106.

More particularly in these respects, when the actuator 45 of the control unit 103 on the left front door 36 of the vehicle is depressed by a rod 14 the kicker 67 of such unit will cause the movable contact 73 to engage the stationary contact 66 so that current will flow from the battery 107 through a conductor 130, contacts 73 and 66, a conductor 131 and conductors 118 and 119, through the lower coils 55 and back to the source through conductors 120, 121 and 122 to simultaneously energize the lower coils of the controls 103 and 105. Current will also flow from the battery 107 through conductors 130, contacts 73 and 66, conductors 118, 117, 112 and 113, through coils 55 of the controls 104 and 106 and back to the battery through conductors 114, 115, 116 and 122 to energize these coils and at the same time energize the lower coils 55 of the controls 103 and 105.

To simultaneously energize all of the upper coils 54 of all of the controls through manipulation of the control 103, rod 14 is pulled upwardly and this will cause current to flow from the battery 107 through conductor 130, contacts 72 and 65, conductors 132, 128 and 129, through coils 54, conductors 80, 120, 121 and 122, back to the battery to energize the upper coils of controls 103 and 105 and at the same time cause current to flow from the battery through conductor 130, contacts 72 and 65, conductors 132, 128, 127, 124, 125 and 126, through the coils 54 and back to the battery through conductors 80, 114, 115, 116 and 122 to energize the upper coils of controls 104 and 106.

Manipulation of the control unit 104 on the right front door may be utilized to simultaneously lock or unlock this door and the locks on the other doors. To effect such locking the rod 14 is depressed to cause the bar 43 to flip the kicker so that it will direct the contact 73 into engagement with the stationary contact 66, whereupon current will flow from the battery 107, conductor 108, a conductor 133, contacts 73 and 66, a conductor 134 and conductors 112 and 113, the lower coils 55 and back to the battery through conductors 114, 115, 116, and 122 to simultaneously energize said coils. Current will also flow from the batery through conductors 108 and 133, contacts 73 and 66, conductors 112, 111, 117, 118 and 119, and coils 55 and back to the battery through conductors 120, 121 and 122 to energize the coils of controls 103 and 105 at the same time the coils of controls 104 and 106 are energized.

To simultaneously energize all of the upper coils 54 of the controls through manipulation of the control 104 when the rod 14 thereof is pulled upwardly will cause current to flow from the battery through conductors 108 and 133, contacts 76 and 65, conductors 135, 125 and 126, coils 54 and back to the battery through conductors 80, 114, 115, 116 and 122 to energize the coils of controls 104 and 106 and at the same time current will flow from the battery through conductors 108 and 133, contacts 72 and 65, conductors 135, 125, 124, 127, 128 and 129, through coils 54 and then back to the battery through conductors 80, 120, 121 and 122 to energize the upper coils 54 of the controls 103 and 105.

As exemplified in Figure 12 each of the four doors is provided with the structure shown in Figure 1 so that the rod 14 of any lock can be actuated to simultaneously electrically lock or unlock all of the doors. In Figure 12, when the actuator 45 on the left front door 36 is moved downwardly by a rod 14, the kicker will move the contact 73 into engagement with the stationary contact 66, and this will cause current to flow from a battery or source 136 through conductors 137, 138 and 139, the lower coils 55 on the left side of the car, conductors 140, 141 and 142, contacts 73 and 66 and back to the battery through conductor 143. Current will also flow from the battery through conductors 144, 145 and 146, through the lower coils on the right side of the car and back to the battery through conductors 147, 148, 149, 150 and 142, contacts 73 and 66, and conductor 143. Thus, all of the lower coils of controls are simultaneously energized to lock the doors.

When the contact 72 of the control on the left front door is moved into engagement with the contact 65, the upper coils will be simultaneously energized to unlock the doors. More specifically, when these contacts are engaged, current will flow from the battery through conductors 137, 138, 139 and 80, the upper coils on the left side of the car and back to the battery through conductors 151, 152, 153 and 154, contacts 72 and 65 and conductor 143. Current will also flow from the battery through conductors 155, 145, 146 and 80, the upper coils 54 on the right side of the car and back to the battery through conductors 156, 153, 152 and 154, contacts 65 and 72, and conductor 143. Thus, all of the upper coils are energized to unlock the doors.

Considering now the control on the left rear door, when contact 73 is moved into engagement with the contact 66, current will flow from the battery through conductors 137, 138 and 139, through the lower coils on the left side of the car and back to the battery through conductors 140, 150, 141, 159, 160 and 161 to energize these two coils. Current will also flow from the battery through conductors 155, 144 and 146, through the lower coils on the right side of the car, and back to the battery through conductors 147, 148, 149, 141, 159, 160 and 161 to energize this pair of coils. All of the lower coils are thus energized to lock all of the doors by simply moving the contact 73 to engage the contact 66.

When the contact 72 of the control unit on the left rear door is moved to engage the contact 65, current will flow from the battery through conductors 137, 138, 139 and 80, the upper coils on the left side of the car and back to the battery through conductors 153, 151 and 162, contacts 72 and 65, and conductors 160 and 161 to energize these coils. Current will also flow from the battery through conductors 155, 145, 146 and 80, the upper coils on the right side of the car and back to the battery through conductors 158, 151, 162, 160 and 161 to energize these particular coils at the same time that the coils on the left side are energized to effect an unlocking of all doors.

All of the doors can also be simultaneously locked by pressing down on the rod 14 on the lock on the right front door 37 to move the kicker to cause the contact 73 to engage the contact 66, in which event current will flow from the battery 136, through conductors 155, 145 and 146, the lower coils 55 of the controls on the right side of the car, and back to the battery through conductors 148, 163 and 164, contacts 66 and 73, and conductor 144 to energize the pair of coils 55. Current will also flow from the battery or source through conductors 137, 138 and 139, the lower coils on the left side of the car and back to the battery through conductors 140, 150, 141, 149, 148 and 167, contacts 66 and 73, and conductors 168 and 144 to simultaneously energize this pair of coils including the coils on the right side of the car to lock all of the doors.

When the rod on the right rear door is pulled upwardly, the contact 72 will engage contact 65 and cause current to flow from the battery through conductors 155, 147, 163, 146 and 80, the upper coils 54 on the right side of the door and back to the battery through conductors 165, 156, 157 and 169, contacts 65 and 72, and conductors 168 and 144 to energize this pair of coils. Current will also flow from the battery through conductors 137, 138, 139 and 80, the upper coils on the left side of the car and back to the battery through conductors 153, 152, 151, 158, 157 and 169, contacts 65 and 72, and conductors 168 and 144 to energize this pair of coils at the same time that the coils on the right side are energized to unlock all of the doors.

Attention is directed to the fact that each of the locks just referred to is locked and unlocked mechanically by manipulating its control rod 14 and that energization and deenergization of the coils assists such manipulation.

In view of the foregoing it will be manifest that I have provided various improved systems for locking and unlocking instrumentalities such as the doors of a vehicle, including various forms of electrical control units, which can be operatively connected in different ways to conventional door locks.

Having thus described my invention, it is obvious that various modifications may be made in the same without departing from the spirit of the invention, and, therefore, I do not wish to be understood as limiting myself to the exact forms, constructions, arrangements, and combinations of parts herein shown and described.

I claim:

1. A control for a lock comprising a support, a pair of stationary contacts, a movable member, a yieldable contact disposed between each stationary contact and the member for normally maintaining the member in a predetermined position and so that the yieldable contacts are normally disengaged from said stationary contacts.

2. A control assembly comprising a support, movable means carried by said support, a first pair of contacts and a second pair of contacts individually mounted on the support, an elongated kicker disposed between the pairs of contacts and having one end pivoted and its other end arranged for engaging the movable means, and actuating means operatively related to the movable means for moving the latter into engagement with the kicker to cause engagement or disengagement of either pair of contacts.

3. A subsassembly of the kind described comprising a support, a tube carried by said support, coils surrounding only the extremities of the tube, a single elongated armature slidably mounted in the tube, a bridge member having ends connected to the ends of the armature, and means intermediate the ends of the bridge member adapted for connection with movable means.

4. In combination: a lock provided with a manual control for locking and unlocking the lock, an elongated actuator connected for movement with the control, a member actuated by the actuator, two pairs of normally spaced contacts, a pivotal element disposed between the pairs of contacts, and means for normally maintaining the movable element in a predetermined position, said control being manipulable whereby the actuator will actuate the member to move the pivotal element so that it will cause engagement or disengagement of either pair of contacts.

5. In combination: a lock provided with a manual control for locking and unlocking the lock, an elongated actuator connected for movement with the control, a member actuated by the actuator, two pairs of normally spaced contacts, and a pivotal element disposed between the pairs of contacts, said control being manipulable whereby the actuator will actuate the member to move the pivotal element so that it will cause engagement or disengagement of either pair of contacts.

6. A locking system comprising a pair of locks, each of said locks having a manual control and actuating means operatively connected thereto, a slidable armature, switch means, and a pair of coils surrounding the armature, and conductors for operatively connecting the coils and switch means with a source of electricity, the arrangement being such that either lock can be locked or unlocked manually by selectively manipulating the manual controls and when the manual control on the one lock is moved in one direction to cause the actuating means to operate its switch means, one coil of the other lock will be energized and cause movement of the armature, actuating means and manual control of the other lock to lock such lock, and when the manual control on the one lock is moved in another direction to cause the actuating means to operate the switch means in a different way, only the other coil of the other lock will be energized to effect a reverse movement of the armature, actuating means and manual control of said other lock to unlock the same; and when the manual control of the other lock is moved to operate its switch means in different ways the coils on the one lock will be alternately energized and deenergized to lock and unlock said one lock in a manner corresponding to the locking and unlocking of said other lock.

7. A locking system of the character defined in claim 6, in which auxiliary switch means are operatively connected with all of the coils and for connection with a source so that this switch means can be manually operated independently of the other switch means associated with the locks to energize and deenergize the coils in a manner whereby both locks can be simultaneously locked or unlocked.

8. A locking system comprising a first pair of locks and a second pair of locks, each of said locks having: an actuating means, a manual control for operating the actuating means, a slidable armature and a pair of coils surrounding only the extremities of the armature, means connecting the armature and actuating means of each lock, one of the locks of each pair of locks also having switch means and movable means operatively related to the actuating means and switch means, and conductors for operatively connecting the coils on all of the locks and all of the switch means with a source of electricity, the arrangement being such that when the manual control on either of said one locks is moved in one direction to cause its actuating means to move the connecting means and armature the movable means will operate the switch to energize only one coil on each of all of the locks and cause the connecting means, actuating means and manual controls on the other locks to lock such locks, and when the manual control on either of said one locks is moved in another direction all of the other coils will be energized and cause a reverse movement of the connecting means, armature, actuating means and manual control of the other locks to unlock such locks.

9. A locking system of the character defined in claim 8, in which a master switch is operatively connected with all of the coils and for connection with a source of electricity so that this switch can be operated independently of the other switch means to energize and deenergize the coils in a manner whereby all of the locks can be simultaneously locked or unlocked.

10. A locking system comprising a pair of locks, each of said locks having: a slidable armature, a pair of coils related to the armature, means actuated by the armature for locking or unlocking each lock; switch means operatively related to one lock, and conductors for connecting the coils on all of the locks and the switch means with a source of electricity in a manner whereby the switch means can be operated to selectively energize and deenergize the coils to cause the armatures associated therewith to operate the actuated means to substantially simultaneously lock or unlock such locks.

11. A locking system comprising a pair of locks, each of said locks having actuating means for locking or unlocking the locks, only one of the locks having switch means, a pivotal element, said actuating means also serving to intermittently actuate the pivotal element to cause the latter to operate the switch means, a slidable armature and a pair of coils operatively related to the armature and actuating means of the other lock with the coils surrounding the armature, and conductors for operatively connecting the switch means and coils with a source of electricity in a manner whereby the actuating means on the said one lock can be manipulated to simultaneously mechanically lock or unlock this lock and also actuate the switch means through the pivotal element to selectively alternately energize or deenergize the coils and cause the armature to move the actuating means of said other lock to lock or unlock the same in response to the manipulation of the actuating means on said one lock.

12. A locking system comprising a pair of locks, each of said locks having: a manual control for locking or unlocking the locks, an electrical assembly including a bracket supporting a tube, coils surrounding only the extremities of the tube, an armature slidably mounted in the tube, a bridge connecting the ends of the armature, means connecting the bridge with the manual control, two pairs of contacts, movable means related to the pairs of contacts and the manual control, and conductors for operatively connecting with a source of electricity the coils and pairs of contacts on the locks in a manner whereby when the manual control on one lock is manipulated in one direction to lock this lock it will also actuate the bridge and the movable means to effect engagement of one pair of contacts and thereby energize a certain coil on each lock and so that the bridge and armature on the other lock will move its manual control to lock said other lock at the same time said one lock is locked, said manual control on said one lock when manipulated in another direction serving to unlock this lock and operate its movable means to cause the other pair to engage and thereby energize only the other coil of each lock and so that the bridge and armature on the other lock will move its manual control to unlock this lock at the same time that said one lock is unlocked, the manual control and the electrical assembly on said other lock being similarly operable to lock or unlock both locks.

13. An electrical control unit adapted for association with a lock comprising a slidably mounted armature, coils surrounding only the ends of the armature, means actuated by said armature, a first pair of contacts, a pair of pivotally mounted members disposed between the first pair of contacts, a second pair of contacts yieldably supported on the pivoted members for engagement with the first pair of contacts, movable means disposed between the pair of pivoted members, means whereby said movable means may be operated by said actuated means, resilient means acting on the pivoted members to cause the pivoted members to forcibly maintain the movable means in a predetermined position, and means for operatively connecting the coils and contacts with a source of electricity, the arrangement being such that when the armature is moved in one direction and the movable means is actuated it will cause the pivoted members to move so that one of the yieldably supported contacts will engage one of the first pair of contacts to energize one of the coils, and when the armature moved in an opposite direction the movable means will be actuated by the actuated means to cause the other yieldably supported contact to engage the other contact of the first pair to energize the other coil.

14. In combination: a control comprising a slidable armature, coils surrounding only the extremities of the armature, a member connected to the armature, means disposed between the coils and actuated by intermittent engagement with said member, and switch means connectible with a source of electricity and the coils for selectively alternately energizing the coils to cause reciprocation of the armature and member as a unit to operate the actuated means.

References Cited in the file of this patent

UNITED STATES PATENTS

| | | |
|---|---|---|
| 498,372 | Ward | May 30, 1893 |
| 1,302,035 | Hall | Apr. 29, 1919 |
| 1,370,111 | Jackson | Mar. 1, 1921 |
| 1,819,410 | Finkenbinder | Aug. 18, 1931 |
| 1,830,256 | Bishop | Nov. 3, 1931 |
| 1,970,807 | Lovell | Aug. 21, 1934 |
| 2,001,787 | Lakin | May 21, 1935 |
| 2,031,523 | Braren | Feb. 18, 1936 |
| 2,103,363 | Hansen | Dec. 18, 1937 |
| 2,156,387 | Goldfinger | May 2, 1939 |
| 2,339,170 | Jacobs | Jan. 11, 1944 |
| 2,371,370 | Ward | Mar. 13, 1945 |
| 2,470,581 | Seaman | May 17, 1949 |
| 2,703,001 | Shinabery | Mar. 1, 1955 |

FOREIGN PATENTS

| | | |
|---|---|---|
| 44,510 | Austria | Oct. 25, 1910 |
| 412,087 | France | Apr. 25, 1910 |